United States Patent
Campbell et al.

(10) Patent No.: US 12,197,512 B2
(45) Date of Patent: *Jan. 14, 2025

(54) DYNAMIC SEARCH INTERFACES

(71) Applicant: Microsoft Technology Licensing, LLC, Redmond, WA (US)

(72) Inventors: Alexander L. Campbell, Bellevue, WA (US); Malik M. Pradhan, Bellevue, WA (US); Robert D. Frye, Bellevue, WA (US); Paul Baecke, London (GB); Kimberly A. Wilton, Redmond, WA (US); Gustavo M. C. Guerra, London (GB); Gaurav S. Anand, London (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/590,766

(22) Filed: Feb. 1, 2022

(65) Prior Publication Data

US 2022/0156327 A1    May 19, 2022

Related U.S. Application Data

(63) Continuation of application No. 15/622,907, filed on Jun. 14, 2017, now Pat. No. 11,269,960.

(60) Provisional application No. 62/506,591, filed on May 15, 2017.

(51) Int. Cl.
 *G06F 16/9038* (2019.01)
 *G06F 16/904* (2019.01)

(52) U.S. Cl.
 CPC ........ *G06F 16/9038* (2019.01); *G06F 16/904* (2019.01)

(58) Field of Classification Search
 CPC .......................... G06F 16/9038; G06F 16/904
 USPC .......................................................... 707/791
 See application file for complete search history.

(56) References Cited

U.S. PATENT DOCUMENTS

| | | | |
|---|---|---|---|
| 6,847,959 B1 | 1/2005 | Arrouye et al. |
| 7,454,706 B1 | 11/2008 | Matthews et al. |
| 7,890,886 B2 | 2/2011 | Matthews et al. |
| 8,185,526 B2 | 5/2012 | Wen et al. |
| 9,443,017 B2 | 9/2016 | Shein et al. |
| 2003/0098891 A1 | 5/2003 | Molander |

(Continued)

OTHER PUBLICATIONS

"Mac Basics: Spotlight helps you find what you're looking for", https://support.apple.com/en-in/HT204014, Published on Mar. 23, 2016, 3 pages.

Lindemann, Will, "Spotlight Search and the App Content Gold Rush", https://medium.com/mobile-growth/spotlight-search-and-the-app-content-gold-rush-5b3bfa66f83f, Published on: Sep. 21, 2015, 3 pages.

Kissell, Joe, "Search the Web without a browser", http://www.macworld.com/article/1138782/searchnobrowser.html. Published on: Feb. 18, 2009, 3 pages.

(Continued)

*Primary Examiner* — Michael Pham
(74) *Attorney, Agent, or Firm* — CALFEE, HALTER & GRISWOLD LLP

(57) ABSTRACT

Systems and methods are disclosed for dynamic search interfaces. In one implementation, a search query is received from a user within a content retrieval interface. The search query is processed with respect to a first content source to determine a relevance of the first content source with respect to the search query. Based on a determination that the first content source exceeds a defined relevance threshold, content from the first content source is requested and/or received. The content received from the first content source is presented within the content retrieval interface.

19 Claims, 7 Drawing Sheets

(56) References Cited

U.S. PATENT DOCUMENTS

| | | | |
|---|---|---|---|
| 2003/0146939 A1 | 8/2003 | Petropoulos et al. | |
| 2004/0215607 A1 | 10/2004 | Travis, Jr. | |
| 2005/0154716 A1 | 7/2005 | Watson et al. | |
| 2005/0289109 A1 | 12/2005 | Arrouye et al. | |
| 2006/0095424 A1 | 5/2006 | Petropoulos et al. | |
| 2006/0282790 A1 | 12/2006 | Matthews et al. | |
| 2007/0033172 A1 | 2/2007 | Williams et al. | |
| 2009/0216735 A1 | 8/2009 | Dexter et al. | |
| 2009/0248642 A1 | 10/2009 | Gurin et al. | |
| 2011/0179021 A1 | 7/2011 | Wen et al. | |
| 2011/0276568 A1 | 11/2011 | Fotev | |
| 2012/0124035 A1 | 5/2012 | Vaidyanathan et al. | |
| 2012/0124519 A1 | 5/2012 | Uphoff et al. | |
| 2013/0339345 A1 | 12/2013 | Soto Matamala et al. | |
| 2014/0317072 A1* | 10/2014 | Gordner | G06F 16/951 707/706 |
| 2014/0358909 A1 | 12/2014 | Kolba et al. | |
| 2015/0278358 A1 | 10/2015 | Abib et al. | |
| 2015/0347532 A1* | 12/2015 | Shaw | G06F 3/0484 707/722 |
| 2018/0330016 A1 | 11/2018 | Campbell et al. | |

OTHER PUBLICATIONS

"Office Action for U.S. Appl. No. 15/622,907", Mailed Date: Apr. 6, 2020, 13 pages.

"Response to the Office Action for U.S. Appl. No. 15/622,907", Filed Date: Jul. 1, 2020, 12 pages.

"Final Office Action for U.S. Appl. No. 15/622,907", Mailed Date: Oct. 1, 2020, 12 pages.

"Response to the Final Office Action for U.S. Appl. No. 15/622,907", Filed Date: Dec. 2, 2020, 12 pages.

"Office Action for U.S. Appl. No. 15/622,907", Mailed Date: Jan. 7, 2021. 14 pages.

"Response to the Office Action for U.S. Appl. No. 15/622,907", Filed Date: Apr. 7, 2021, 13 pages.

"Final Office Action for U.S. Appl. No. 15/622,907", Mailed Date: Jun. 30, 2021, 20 pages.

"Response to the Final Office Action for U.S. Appl. No. 15/622,907", Filed Date: Sep. 30, 2021, 19 pages.

"Notice of Allowance and Fees Due for U.S. Appl. No. 15/622,907", Mailed Date: Oct. 29, 2021, 11 pages.

* cited by examiner

DYNAMIC SEARCH INTERFACES

RELATED APPLICATIONS

This application is a continuation of U.S. patent application Ser. No. 15/622,907, filed Jun. 14, 2017, and entitled "DYNAMIC SEARCH INTERFACES", which claims priority to U.S. Provisional Patent Application No. 62/506,591, filed May 15, 2017, entitled "DYNAMIC SEARCH INTERFACES". The entireties of these applications are incorporated herein by reference.

TECHNICAL FIELD

Aspects and implementations of the present disclosure relate to data processing and, more specifically, but without limitation, to dynamic search interfaces.

BACKGROUND

Search engines enable retrieval of information in response to search queries. Some search engines can retrieve information from multiple data sources.

SUMMARY

The following presents a shortened summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a compact form as a prelude to the more detailed description that is presented later.

In one aspect of the present disclosure, systems and methods are disclosed for dynamic search interfaces. In one implementation, a search query is received from a user within a content retrieval interface. The search query is processed with respect to a first content source to determine a relevance of the first content source with respect to the search query. Based on a determination that the first content source exceeds a defined relevance threshold, content from the first content source is requested and/or received. The content received from the first content source is presented within the content retrieval interface.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Aspects and implementations of the present disclosure are directed to dynamic search interfaces.

It can be appreciated that various search technologies can enable users to search across multiple content sources. However, users must often launch separate applications (e.g., a web browser) in order to view, access, or otherwise interact with such results. Doing so can be inefficient in many scenarios, such as when a user wishes to obtain or access information quickly (e.g., to check the weather, flight status, a stock price, etc.).

Accordingly, described herein in various implementations are technologies, including methods, machine readable mediums, and systems, that enable dynamic search interfaces. The described technologies enable a user to provide/submit a search query within a search interface. The provided such query can be searched across multiple content sources (e.g., local documents, the Internet, etc.). The respective search results from these content sources can be analyzed to compute a degree to which the results are likely to be relevant to the query as provided by the user. Upon determining that a certain content source (e.g., Internet search results) are likely relevant to the search query, such results can be presented within the search interface (e.g., the interface within which the search was performed/initiated). In doing so, those search results determined to be likely to be relevant to the query can be provided/presented within the context in which the search was initially performed (e.g., a search box contained within a navigation bar of an operating system interface). Rather than launching another application (e.g., a web browser) to view/access such search results, the described technologies enable the user to view/access the results/content within the interface in which the search was initially performed. Doing so increases efficiency with respect to operation of the device and with respect to the user's interaction with it, as described herein.

It can therefore be appreciated that the described technologies are directed to and address specific technical challenges and longstanding deficiencies in multiple technical areas, including but not limited to content retrieval, search engines, and user interfaces. As described in detail herein, the disclosed technologies provide specific, technical solutions to the referenced technical challenges and unmet needs in the referenced technical fields and provide numerous advantages and improvements upon conventional approaches. Additionally, in various implementations one or more of the hardware elements, components, etc., referenced herein operate to enable, improve, and/or enhance the described technologies, such as in a manner described herein.

Figure 1:
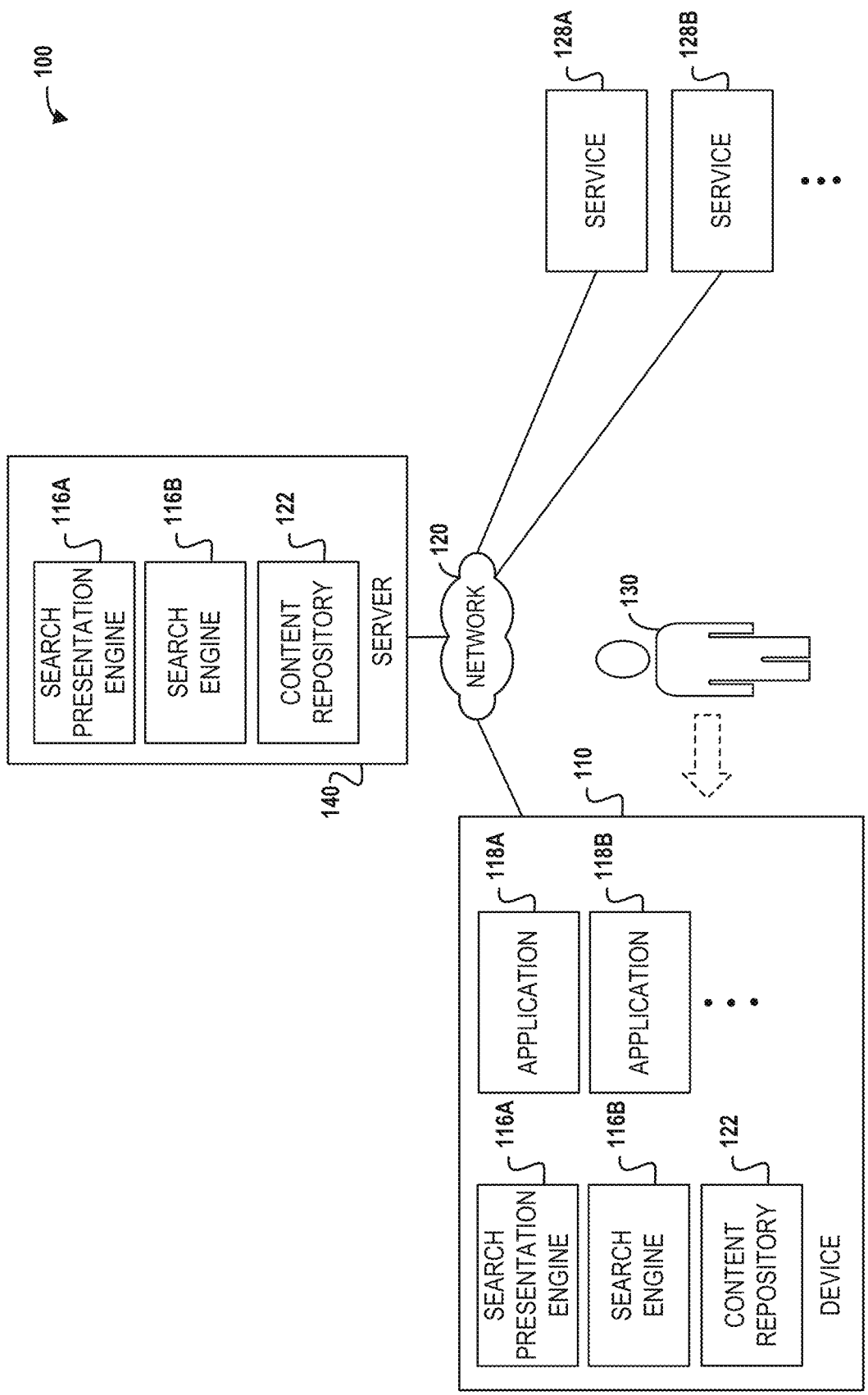
FIG. 1 illustrates an example system, in accordance with an example embodiment.

FIG. 1 illustrates an example system 100, in accordance with some implementations. As shown, the system 100 includes device 110 which can be a laptop computer, a desktop computer, a terminal, a mobile phone, a tablet computer, a smart watch, a personal digital assistant (PDA), a digital music player, a server, a wearable device, a virtual reality device, an augmented reality device, a holographic device, and the like. User 130 can be a human user who interacts with device 110. For example, user 130 can provide various inputs (e.g., via an input device/interface such as a keyboard, mouse, touchscreen, microphone—e.g., for voice/audio inputs, etc.) to device 110. Device 110 can also display, project, and/or otherwise provide content to user 130 (e.g., via output components such as a screen, speaker, etc.).

As shown in FIG. 1, device 110 can include search presentation engine 116A. Search presentation engine 116A can be an application or module that configures/enables device 110 to perform various operations such as are described herein. For example, search presentation engine 116A can configure or enable device 110 to process various search queries, such as those received from user 130. In certain implementations, such search queries can be processed to determine the relevance of a particular content source with respect to the search query. Examples of such content sources include but are not limited to remote content (e.g., web pages/content accessed via the Internet), local content (e.g., documents, files, data, etc. stored on device 110), etc. Having identified content from a particular content source (e.g., search results from an Internet search engine) as being relevant to the received search query, such identified content can be presented/provided via a user interface of the device 110, as described herein.

By way of further illustration, in certain implementations device 110 can include search engine 116B. Search engine 116B can be an application or module configured to search and/or retrieve content (e.g., documents, files, etc.) stored on device 110. In certain implementations, such content can be stored within content repository 122 of device 110.

Content repository 122 can be a storage resource such as an object-oriented database, a relational database, etc. within which documents, files, data, etc. can be stored (e.g., on device 110). It should be understood that, in various implementations, search engine 116B and/or content repository 122 can also be employed on other machines/devices (e.g., in scenarios in which device 110 utilizes remote or 'cloud'-based storage to store documents, files, etc.).

In certain implementations content repository 122 can also include or incorporate a log that maintains record(s) of various actions performed by user 130. For example, the referenced log can include a browsing history of websites the user has previously visited, searches, the user has previously performed, documents/applications the user has executed or accessed, etc. It should be understood that the described technologies can be configured to enable user 130 to 'opt-in,' 'opt-out,' and/or otherwise configure various parameters, settings, etc., with respect to the described functionality. For example, the user may configure what types of content, activity, etc. should or should not be stored. Additionally, the described technologies utilize data encryption, identity verification, and/or related technologies to ensure that the referenced content cannot be accessed/retrieved by unauthorized parties. In doing so, the described technologies enable the described benefits and technical improvements to be realized while maintaining the security and privacy of the user's data.

Figure 2:
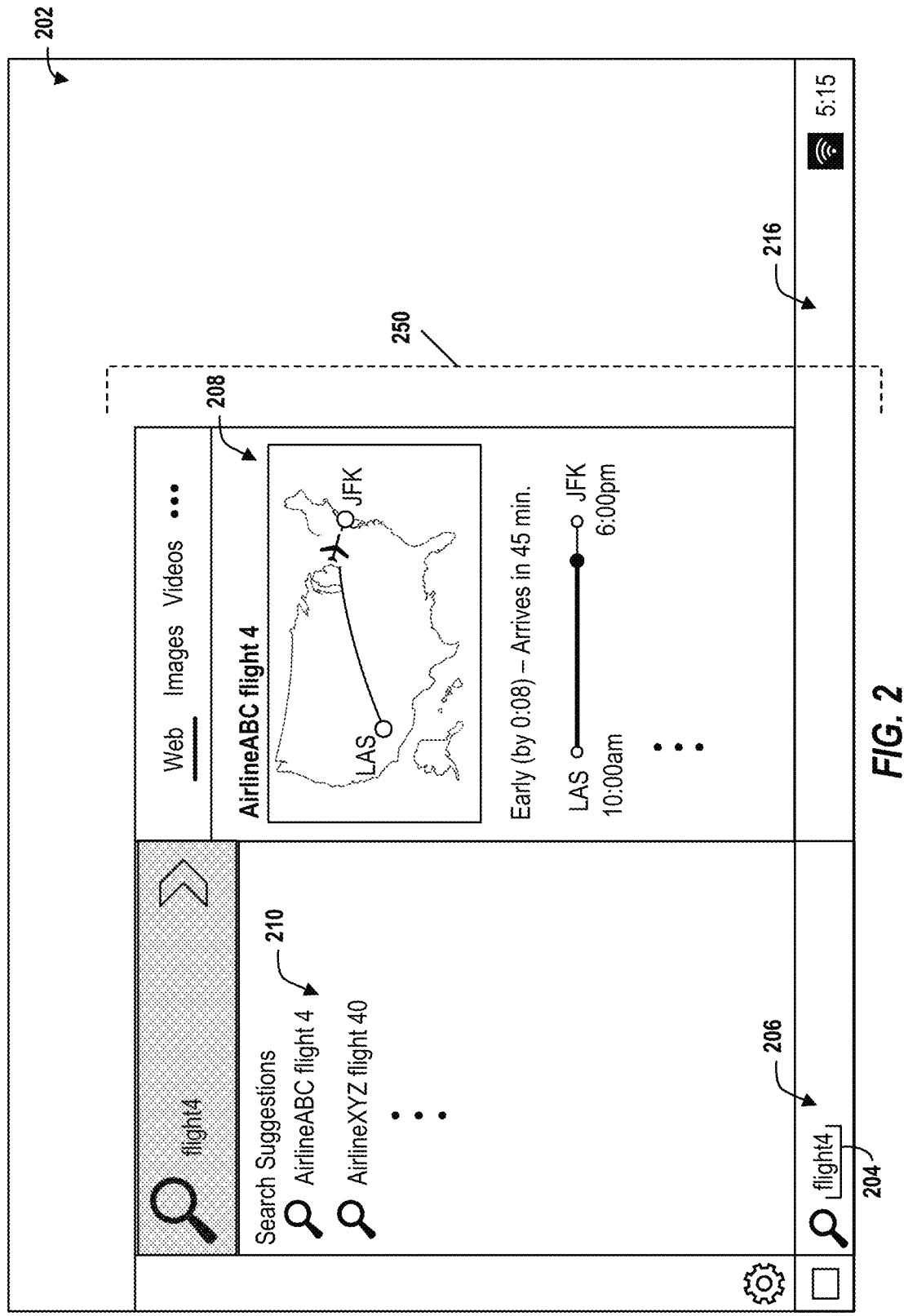
FIG. 2 illustrates an example scenarios described herein, according to an example embodiment.

As noted above, device 110 provides various interfaces to user 130, such as a user interface (e.g., a graphical user interface (GUI). Such interface(s) can be presented via display device(s) such as a light emitting diode (LED) display, a liquid crystal display (LCD) display, a touchscreen display, and/or any other such device capable of displaying, depicting, or otherwise presenting user interface(s). Such user interfaces can be graphical depiction(s) of an operating system and/or various applications executing on device 110. FIG. 2 depicts an example user interface 202 presented via device 110.

It should be noted that while the interface(s) depicted in FIG. 2 (as well as various other examples and illustrations provided herein) are those that can be presented on a laptop or desktop computing device, this is simply for the sake of clarity and brevity. Accordingly, in other implementations device 110 can be various other types of devices, including but not limited to various portable and/or wearable devices. In such scenarios, the described technologies can operate in the manner described herein within the context of the user interface of the particular device (smartphone, tablet device, etc.).

Figure 7:
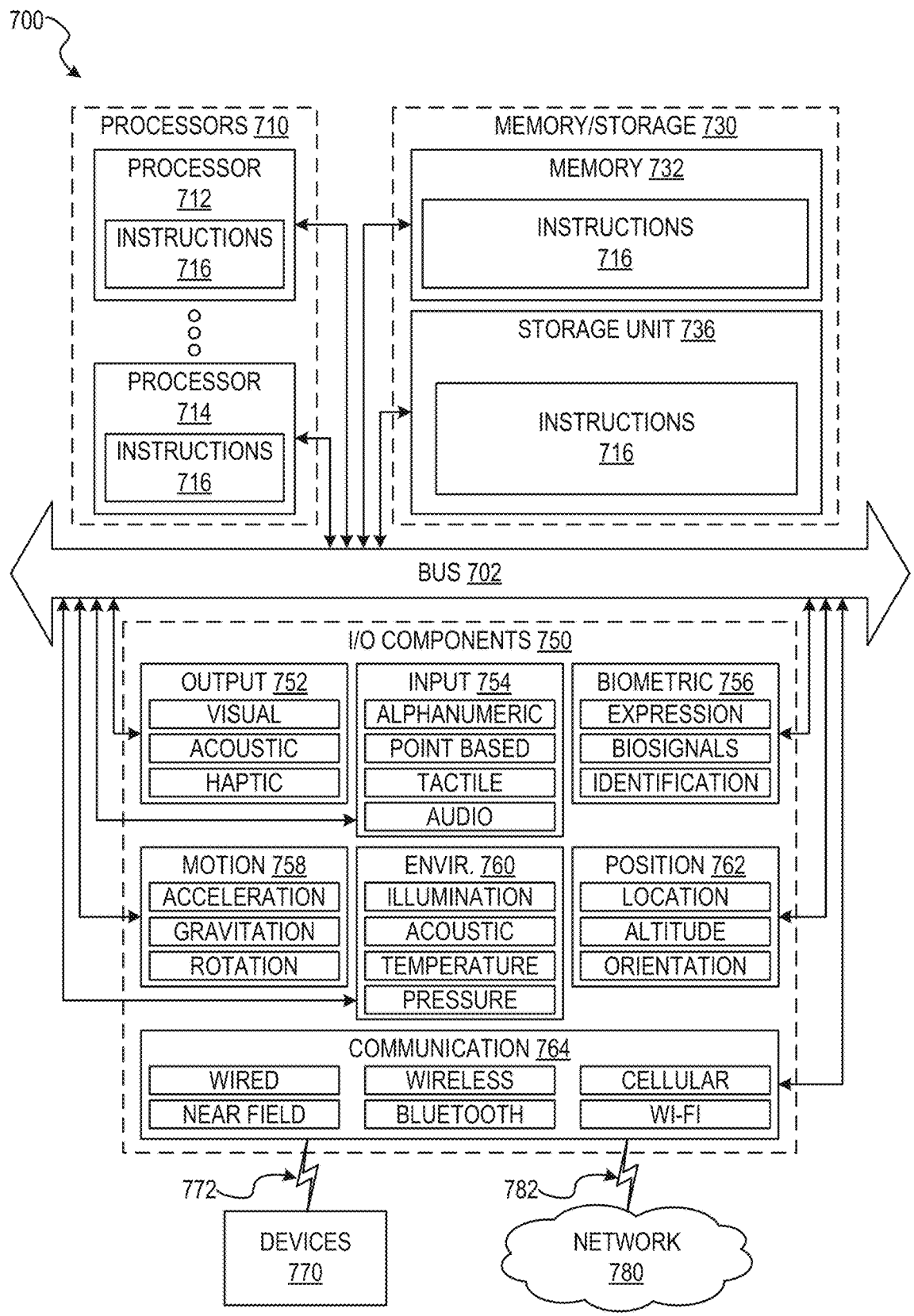
FIG. 7 is a block diagram illustrating components of a machine able to read instructions from a machine-readable medium and perform any of the methodologies discussed herein, according to an example embodiment.

As shown in FIG. 1, device 110 can also include various applications, programs, modules, etc., such as application 118A and application 118B. The referenced applications can be stored in memory of device 110 (e.g. memory 730 as depicted in FIG. 7 and described below). One or more processor(s) of device 110 (e.g., processors 710 as depicted in FIG. 7 and described below) can execute such q application(s). In doing so, device 110 can be configured to perform various operations, present content to user 130, etc. Examples of such applications include but are not limited to: web browsers, productivity applications (e.g., word processors, spreadsheet applications, etc.), social media/messaging applications, etc.

It should also be noted that while various components (e.g., search presentation engine 116A, search engine 116B application 118A, etc.) are depicted (e.g., in FIG. 1) as operating on a device 110, this is only for the sake of clarity. However, in other implementations the referenced components (e.g., search presentation engine 116A) can also be implemented on other devices/machines. For example, in lieu of (and/or in addition to) executing locally at device 110, search presentation engine 116A can be implemented remotely (e.g., on a server device or within a cloud service or framework).

As also shown in FIG. 1, device 110 can connect to and/or otherwise communicate with server 140 via network 120. Network 120 can include one or more networks such as the Internet, a wide area network (WAN), a local area network (LAN), a virtual private network (VPN), an intranet, and the like.

Server 140 can be, for example, a server computer, computing device, storage service (e.g., a 'cloud' service), etc., and can include search presentation engine 116A, search engine 116B application 118A, and content repository 122. For example, in certain implementations, search engine 116B can receive search queries (e.g., from device 110), perform the referenced search operation(s), and provide content (e.g., search results, etc.) back to device 110.

In various implementations, the described technologies may control, instruct, or otherwise communicate with various services such as service 128A and service 128B (collectively services 128), as shown in FIG. 1. Such services can be, for example, third-party services that can provide information and/or various functionality, e.g., to user 130 (e.g., information services, social media services, etc.) that may enhance or otherwise be relevant to certain operations described herein. In certain implementations, such services can provide information such as weather information (e.g., in a particular location), flight arrival/departure information, social media services, etc.

While many of the examples described herein are illustrated with respect to a single device 110, this is simply for the sake of clarity and brevity. However, it should be understood that the described technologies can also be implemented (in any number of configurations) across multiple devices and/or other machines/services.

Further aspects and features of device 110 and server 140 are described in more detail in conjunction with FIGS. 2-7, below.

FIG. 2 depicts an example GUI 202 such as can be displayed or otherwise presented to user 130 at device 110. As shown in FIG. 2, user 130 can provide a search query 204 (here, 'flight4') into search box 206. Search box 206 can be, for example, a field or region within GUI 202 within which user 130 can input search queries. In certain implementations, the referenced search box 206 can be integrated within an element or aspect of the user interface of the operating system (and/or an application) executing on device 110. For example, search box 206 can be integrated within a navigation bar 216 (or another element) of GUI 202, as shown.

Upon receiving the referenced search query 204, the query can be processed. In certain implementations, the query can be processed on an ongoing basis while the user is inputting the query (e.g., after each subsequent character is input). In doing so, it can be determined which content source (or sources) are likely to contain or provide content/results that are most relevant to the query.

For example, in certain implementations search presentation engine 116A can coordinate the performance of multiple searches, e.g., in parallel across multiple content sources. As described herein, such content sources can be remote content sources (e.g., the Internet, other remote data repositories, etc.), local content sources (e.g., content repository 122 on device 110 containing local files), etc. The content/results received from each of the referenced content sources can be processed, analyzed, etc., to determine their respective relevance. For example, a relevance score or metric can be computed for a particular content source based on the content/results provided/obtained from such a source. Such a relevance score can reflect the degree to which the content/results provided/obtained from the source are likely to be relevant to the query as provided by/received from user 130. In certain implementations, a relevance threshold can define or dictate a minimum relevance score/metric to be met in order for the referenced content to be presented in the manner described herein. In doing so, content/search results determined to be unlikely to be relevant can be precluded/prevented from being presented in the manner described herein.

By way of illustration, with respect to query 204 as depicted in FIG. 2 ('flight4'), it can be determined that search results from the Internet (e.g., those reflecting the current status of 'AirlineABC flight 4') are likely to be relevant to the referenced query. Moreover, in certain implementations, the relevance of such results (e.g., from the Internet) can be compared to the relevance of other search results identified/received with respect to other content sources. For example, a parallel search of local documents/files on device 110 containing or named 'flight4' can be performed, and the relevance of such results to the query can be computed and compared with the determined relevance of the Internet search results.

Having determined that search results from a particular content source (e.g., an Internet search engine) are likely to be relevant to the provided search query, a section or region of the user interface of device 110 can be populated with such content. For example, as shown in FIG. 2, region 208 of GUI 202 can expand (e.g., with respect to the interface elements within which the search was initiated, e.g., search box 206). Region 208 of GUI 202 can also be populated with content, information, etc., retrieved/received from the referenced content source (e.g., the content sourced determined to be relevant to the query—here, an Internet search engine). In doing so, rather than launching or initiating another application (e.g. a web browser) in order to view the referenced search results, user 130 can be presented with such content within the same interface within which the initial search (that can considered multiple content sources) is performed.

As also shown in FIG. 2, in certain implementations various suggested queries 210 (e.g., 'AirlineABC flight 4') can also be generated and/or presented within GUI 202. Such suggested queries can reflect additional queries determined to be relevant or similar to the received query 206 with respect to the identified content source (here, an Internet search engine). For example, as shown in FIG. 2, suggested queries 210 reflect additional queries that can be provided to the identified content source (here, an Internet search engine) that are determined to be likely to be relevant/similar to the received query 204. By way of further example, suggested queries 210 can reflect additional queries that can be provided to the identified content source (here, an Internet search engine) that are determined to be likely to generate search results from the content source that are also likely to be relevant to the original query 204 provided by the user. By selecting one of the referenced suggested queries 210, region 208 can be populated with content (e.g., from the Internet) corresponding to the selected query.

Figure 3:
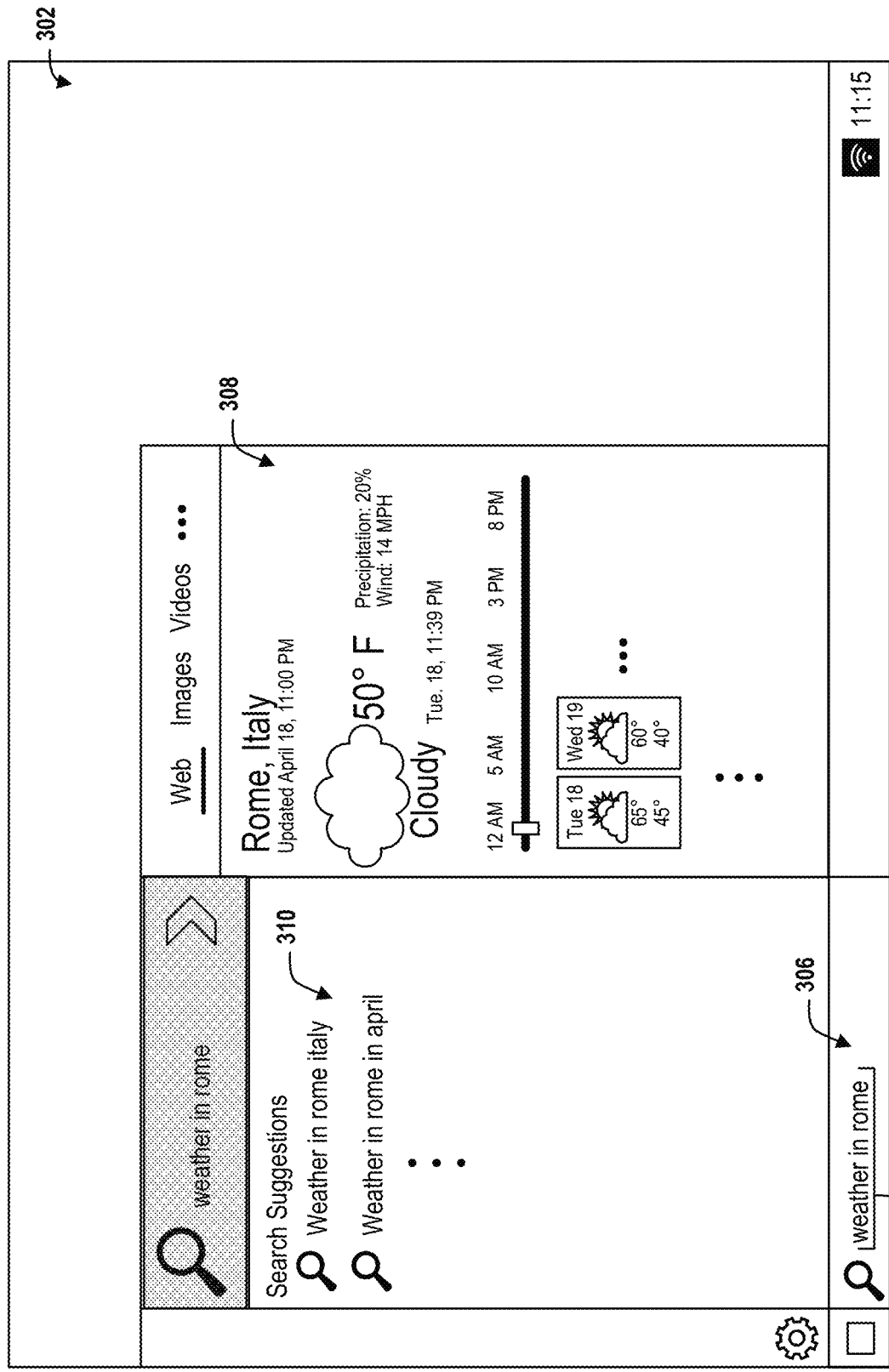
FIG. 3 illustrates an example scenarios described herein, according to an example embodiment.

FIG. 3 depicts another example GUI 302 such as can be displayed or otherwise presented at device 110. As shown in FIG. 3, user 130 can provide a search query 304 (here, 'weather in rome') into search box 306. Upon determining that the search results originating from a particular content source (e.g., an Internet search engine) are relevant (e.g., above a defined relevance threshold), region 308 of GUI 302 can expand. For example, region 308 can expand with respect to/in relation to the interface element(s) with respect to which the search is conducted/initiated (e.g., search box 306), as shown. Region 308 of GUI 302 can be populated with content retrieved/received from the referenced content source (e.g., the Internet search engine). In doing so, rather than launching or initiating another application (e.g. a web browser) in order to view the referenced search results, user 130 can be presented with such content within the same interface within which the initial search (which can consider multiple content sources) is performed.

In certain implementations, prior actions/operations associated with the user that provided the referenced query can be accounted for in determining the relevance of content from a particular content source to the provided query. For example, a browsing or activity history of user 130 (and/or device 110) can be accounted for in determining the relevance of content from a particular content source to the provided search query.

By way of illustration, with respect to GUI 302 as depicted in FIG. 3, it certain scenarios it can be determined (e.g., based on prior actions, behavior, etc., of a user) that the user is not actually interested in the current weather in the city of Rome. For example, a particular user may actually be searching for a document with the title 'Weather in Rome.' Accordingly, even when initially presented with GUI 302 (as shown in FIG. 3) in response to query 304, such a user is likely to dismiss or ignore the presented content, and instead manually retrieve the referenced 'Weather in Rome' document. In such a scenario, upon subsequently receiving the same/similar query, the referenced document can be retrieved (in lieu of presenting internet search results). Such a determination (that the 'Weather in Rome' document is likely more relevant to the query as provided from the particular user) can be computed based on prior actions/behavior of such a user (in which the user ignored/dismissed Internet search content for the same query and instead retrieved the referenced document).

Figure 4:
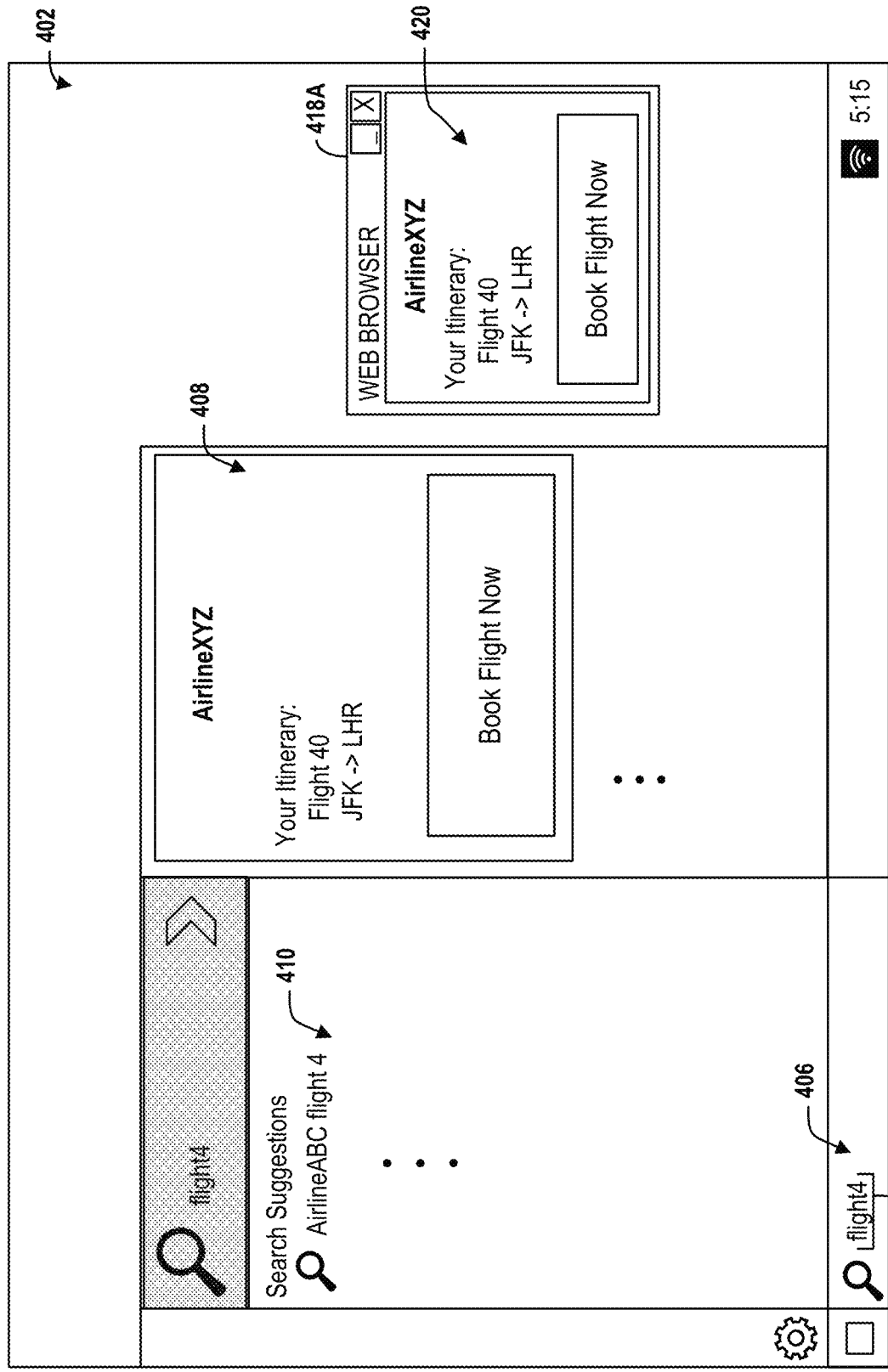
FIG. 4 illustrates an example scenarios described herein, according to an example embodiment.

Moreover, in certain implementations various applications executing on device 110 (and/or the content sources accessed by such applications) can be accounted for in determining the relevance of a particular content source. For example, FIG. 4 depicts a scenario in which device 110 is executing an application (here, web browser 418A). As shown in FIG. 4, web browser 418A can further include content 420 (here, a website within which user 130 is in the process of booking an airline ticket on 'Flight 40'). Accordingly, upon receiving query 406 ('flight4,' which is otherwise comparable to the query depicted in FIG. 2), it can be determined that the content 420 shown in browser 418A (the booking webpage for Flight 40) may be of particular relevance the query as provided by the user. Accordingly, as shown in FIG. 4, the referenced content 420 (the booking webpage for Flight 40) can be depicted in region 408 in response to query 404. As noted, such content 420 can be presented in region 408 lieu of or ahead of the content depicted in FIG. 2 (which may be likely to be relevant to most instances of query 'flight4' but may be less likely to be relevant to the particular user in the scenario depicted in FIG. 4). In doing so, rather than initiating or transitioning to another application (e.g., browser 418A) in order to view the referenced content 410, user 130 can be presented with such content within the same interface within which the initial search (which can consider multiple content sources) is performed.

Figure 5:
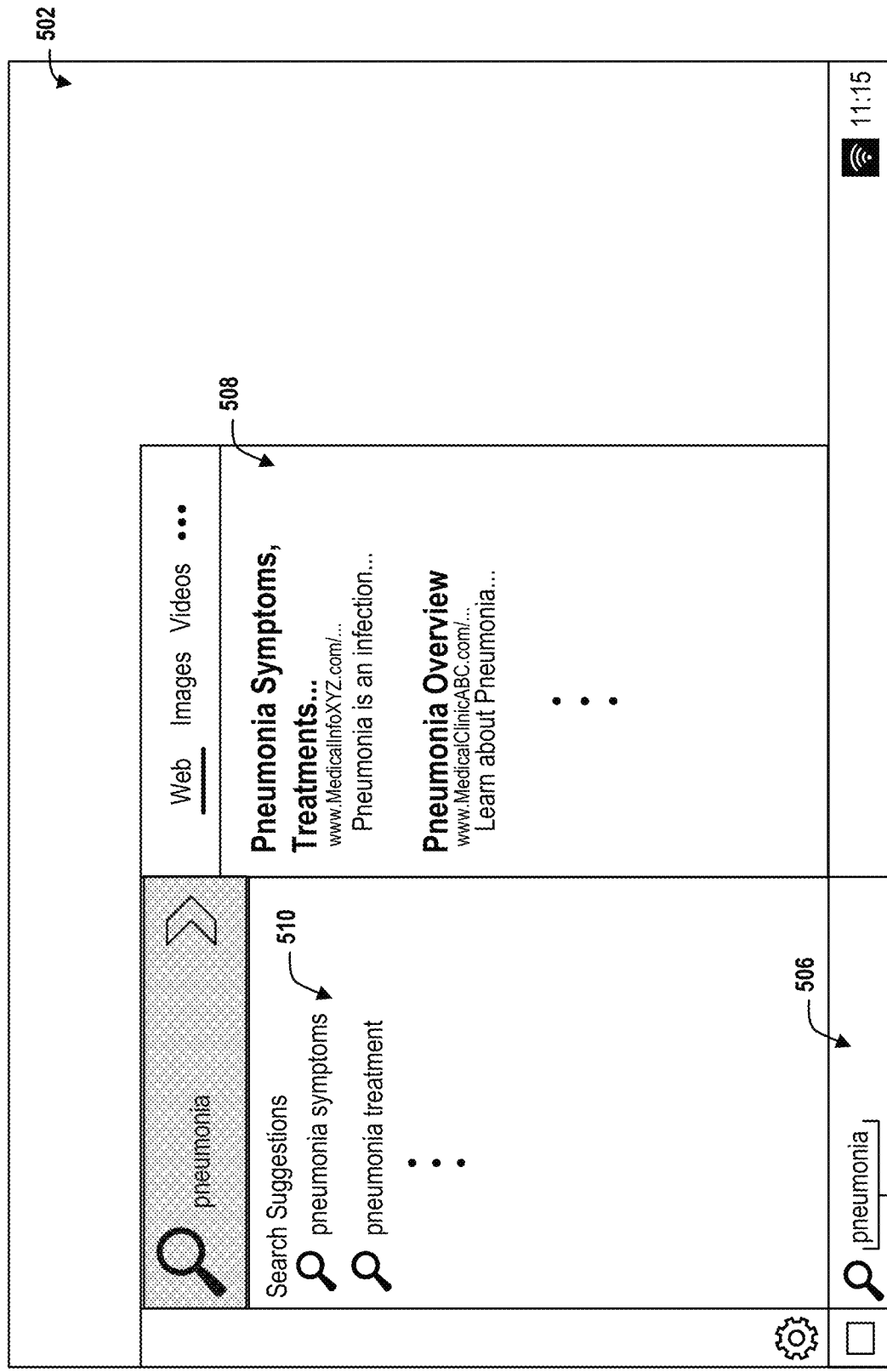
FIG. 5 illustrates an example scenarios described herein, according to an example embodiment.

FIG. 5 depicts another example GUI 502 such as can be displayed or otherwise presented at device 110. As shown in FIG. 5, user 130 can provide a search query 504 (here, 'pneumonia') into search box 506. Upon determining that the search results originating from a particular content source (e.g., an Internet search engine) are relevant (e.g., above a defined relevance threshold), region 508 of GUI 502 can expand (e.g., with respect to/in relation to search box 506, as shown). Region 508 of GUI 502 can be populated with content (e.g., hyperlinks and/or other content) retrieved/received from the referenced content source (e.g., the Internet search engine). In doing so, rather than launching or initiating another application (e.g. a web browser) in order to view the referenced search results, user 130 can be presented with such content within the same interface within which the initial search (which can consider multiple content sources) is performed. Additionally, as shown in FIG. 5, various suggested queries 510 can be generated/presented within GUI 502. Such suggested queries can reflect additional queries determined to be relevant or similar to the received query 506 with respect to the identified content source, as described herein.

As used herein, the term "configured" encompasses its plain and ordinary meaning. In one example, a machine is configured to carry out a method by having software code for that method stored in a memory that is accessible to the processor(s) of the machine. The processor(s) access the memory to implement the method. In another example, the instructions for carrying out the method are hard-wired into the processor(s). In yet another example, a portion of the instructions are hard-wired, and a portion of the instructions are stored as software code in the memory.

Figure 6:
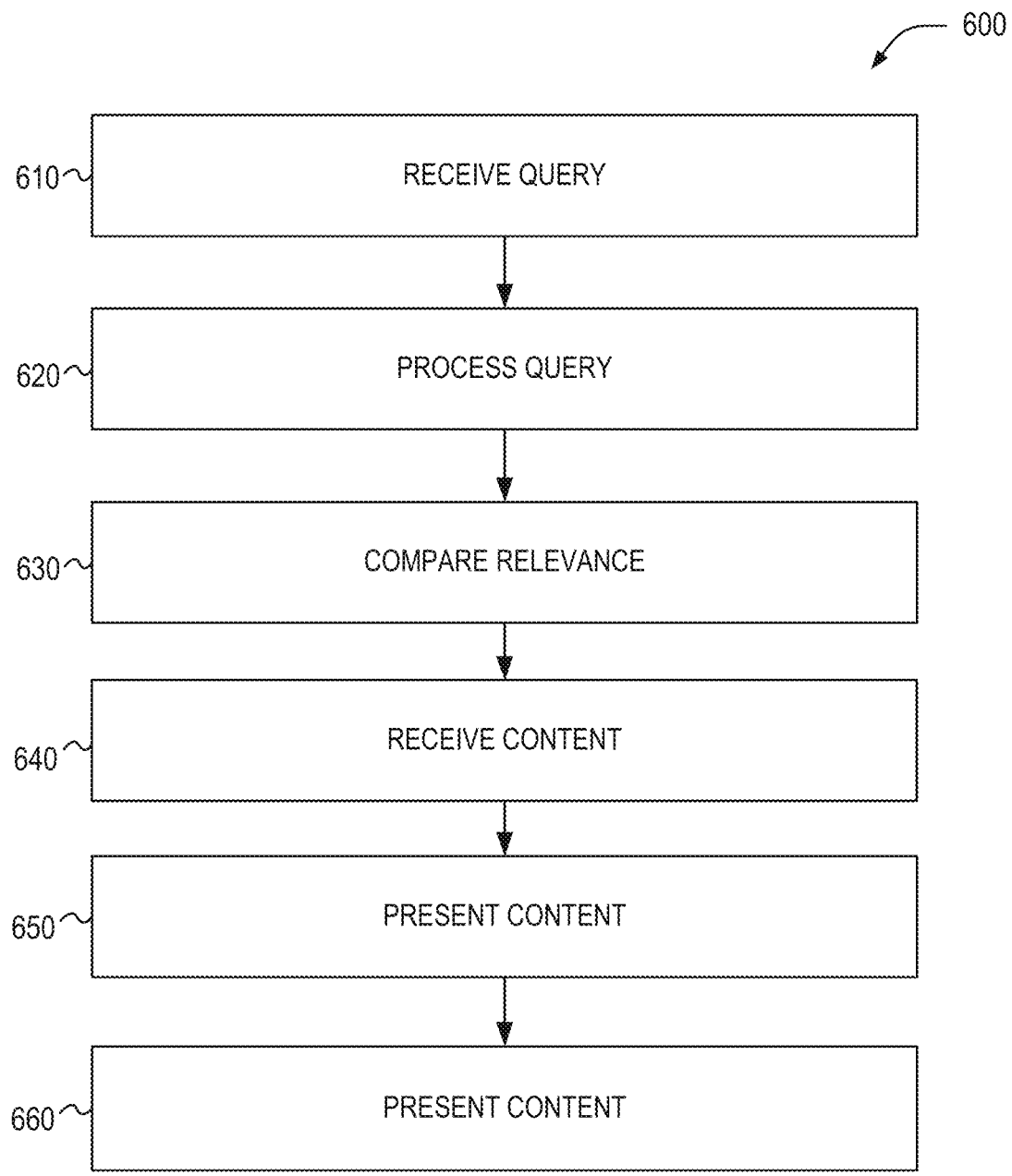
FIG. 6 is a flow chart illustrating a method, in accordance with an example embodiment, for dynamic search interfaces.

FIG. 6 is a flow chart illustrating a method 600, according to an example embodiment, for dynamic search interfaces. The method is performed by processing logic that can comprise hardware (circuitry, dedicated logic, etc.), software (such as is run on a computing device such as those described herein), or a combination of both. In one implementation, the method 600 is performed by one or more elements depicted and/or described in relation to FIG. 1 (including but not limited to device 110 search presentation engine 116A, and/or search engine 116B), while in some other implementations, the one or more blocks of FIG. 6 can be performed by another machine or machines.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At operation 610, a search query is received. Such a search query can be received from a user (e.g., user 130 as shown in FIG. 1). The search query can include but is not limited to one or more alphanumeric characters, words, strings, and/or other content elements. Moreover, in certain implementations the search query can be received with respect to a search tool (e.g., a search engine such as search engine 116B) configured to search local content and/or remote content, as described herein.

In certain implementations, the referenced search query can be received within/in relation to a content retrieval interface. Such a content retrieval interface can be an element, portion, or region of a graphical user interface (e.g., of an application or operating system) within which search queries can be provided/submitted and content/results can be presented (e.g., in response to such queries). An example content retrieval interface 250 is depicted in FIG. 2. As shown in FIG. 2, content retrieval interface 250 can include search box 206 (which can be integrated within navigation bar 216, as described above) and region 208 (which can be an expanding panel or interface element that is populated with content, information, etc., retrieved/received from a content source in response to a query).

In certain implementations, various aspects of operation 610 (as well as the other operations described with respect to FIG. 6) are performed by device 110, search presentation engine 116A, and/or search engine 116B (e.g., as depicted in FIG. 1). In other implementations, such aspects can be performed by one or more other elements/components, such as those described herein.

At operation 620, the search query (e.g., as received at operation 610) is processed. In certain implementations, the query is processed with respect to/in relation to a first content source. Examples of such content sources include but are not limited to remote content sources (e.g., web pages/content accessed via the Internet), local content sources (containing documents, files, data, etc. stored on device 110), etc. In doing so, the relevance (e.g., a relevance score or metric) of the first content source (e.g., Internet search results) with respect to the search query (and further in view of the user that provided the query) can be determined, as described herein.

In certain implementations, the referenced search query can also be processed with respect to a second content source (e.g., stored documents, etc.). In doing so, the relevance of such a second content source with respect to the search query (e.g., as provided by a particular user) can also be determined. As described herein, the respective relevance scores of multiple content sources can be compared to identify/determine the content source that provides content/results likely to be most relevant to the particular query (e.g., as provided by a particular user). For example, as described above, Internet search results may be likely to be more relevant than local document/file search results for a particular search query.

Moreover, in certain implementations the received search query can be provided to a remote service (e.g., a search engine executing on a remote device/server, such as server 140). In response, search result(s) associated with the search query can be received from the remote service (and utilized in the manner described herein).

In certain implementations the received search query can be processed, e.g., with respect to a previous search instance (e.g., as stored/reflected within a browsing history associated with the user). As described above, such a prior search instance can reflect, for example, websites that the user previously visited, searches the user previously performed, etc. Additionally, in certain implementations, the received search query can be processed with respect to various actions, operations, selections, etc. associated with the user. Such actions, etc. can be identified/reflected within an activity history associated with the user (reflecting, for example, previous content selections—e.g., from previously presented search results—that the user did or did not make). In doing so, the relevance of the first content source with respect to the search query as provided by the user can be determined. For example, as described above, by further accounting the browsing history, activity history, etc. of a user, the relevance of a particular content source with respect to a query provided by the user can be more accurately determined.

Additionally, in certain implementations an intent of the user can be determined or otherwise identified (e.g., based on the search query). Such an intent can reflect, for example, an action, operation, transaction, etc., that the user is likely to be interested in performing. Examples of such intents include but are not limited to viewing content on a particular website, opening a particular document, changing a particular setting on a device, etc. In certain implementations, such an intent can reflect an intent of the user with respect to an application. For example, the intent can reflect that the user wishes to perform certain operations/actions with respect to a particular application (e.g., a web browser, text editing application, etc.).

Moreover, having identified an application and/or an intent with respect to which certain content/results are determined to be relevant, various operations, functions, options, etc., can be presented within the referenced content retrieval interface. Such operations, functions, options, etc., can be those that may be relevant/applicable to a particular application, file, etc. included within the relevant search results. Various selectable elements, controls, etc. can be presented, e.g., within the content retrieval interface that, when selected, can initiate the corresponding operations, functions, etc. For example, in a scenario in which a particular type of document (e.g., a text document) is identified, various options such as 'open document,' edit document,' edit document with a particular text editor,' etc. can be presented (e.g., within the referenced content retrieval interface). In doing so, options that are particular to/appropriate for particular content/content source can be presented to the user within the interface in which the content is being identified/retrieved. The user can thus more efficiently take subsequent actions with respect to the content within the same context in which the content was identified.

In certain implementations, an application accessing the content from the first content source can be identified. For example, as depicted in FIG. 4 and described above, it can be determined that a user is accessing a particular content source/content within an application such as a browser (e.g., within one of the tabs of the browser).

At operation 630, the relevance of the first content source (e.g., as computed at operation 620) can be compared with the relevance of the second content source, e.g., with respect to the search query (e.g., as received at operation 610). For example, a relevance score for Internet search results with respect to a particular query can be compared to a relevance score for document/file search results of documents stored on device 110. In doing so, it can be determined which content source provides more relevant results with respect to the particular query (and/or is more relevant with respect to an identified intent).

At operation 640, content from the first content source can be requested and/or received. For example, in a scenario in which Internet search results are determined to be relevant to a particular query, content corresponding to such results can be requested and/or received (e.g., from an Internet search engine). In certain implementations, such content can be requested/received based on a determination that the first content source exceeds a defined relevance threshold.

At operation 650, the content received from the first content source (e.g., at operation 640) can be presented. In certain implementations, such content can be presented within a content retrieval interface. For example, as shown in FIG. 2 and described herein, search results and/or corresponding content received from an Internet search engine can be presented within content retrieval interface 250. In certain implementations, such content can be presented with a region of the content retrieval interface (e.g., in conjunction with the search box and related navigation elements within which the search was conducted, as shown and described herein).

In certain implementations, the content received from the first content source can be presented based on a determination that the relevance of the first content source exceeds the relevance of the second content source with respect to the search query (e.g., based on the comparison at operation 630). Additionally, in certain implementations, the content from the first content source can be presented as accessed within an application executing on device 110 (e.g., as depicted in FIG. 4 and described above).

At operation 660, content from the second content source is presented within the content retrieval interface. In certain implementations, such content can be presented based on a determination that the relevance of the second content source exceeds the relevance of the first content source with respect to the search query in relation to the user, as described above.

It should also be noted that while the technologies described herein are illustrated primarily with respect to dynamic search interfaces, the described technologies can also be implemented in any number of additional or alternative settings or contexts and towards any number of additional objectives. It should be understood that further technical advantages, solutions, and/or improvements (beyond those described and/or referenced herein) can be enabled as a result of such implementations.

Certain implementations are described herein as including logic or a number of components, modules, or mechanisms. Modules can constitute either software modules (e.g., code embodied on a machine-readable medium) or hardware modules. A "hardware module" is a tangible unit capable of performing certain operations and can be configured or arranged in a certain physical manner. In various example implementations, one or more computer systems (e.g., a standalone computer system, a client computer system, or a server computer system) or one or more hardware modules of a computer system (e.g., a processor or a group of processors) can be configured by software (e.g., an application or application portion) as a hardware module that operates to perform certain operations as described herein.

In some implementations, a hardware module can be implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module can also include programmable logic or circuitry that is temporarily configured by software to perform certain operations. For example, a hardware module can include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering implementations in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor can be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In implementations in which multiple hardware modules are configured or instantiated at different times, communications between such hardware modules can be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors can also operate to support performance of the relevant operations in a "cloud computing" environment or as a "software as a service" (SaaS). For example, at least some of the operations can be performed by a group of computers (as examples of machines including processors), with these operations being accessible via a network (e.g., the Internet) and via one or more appropriate interfaces (e.g., an API).

The performance of certain of the operations can be distributed among the processors, not only residing within a single machine, but deployed across a number of machines. In some example implementations, the processors or processor-implemented modules can be located in a single geographic location (e.g., within a home environment, an office environment, or a server farm). In other example implementations, the processors or processor-implemented modules can be distributed across a number of geographic locations.

The modules, methods, applications, and so forth described in conjunction with FIGS. 1-6 are implemented in some implementations in the context of a machine and an associated software architecture. The sections below describe representative software architecture(s) and machine (e.g., hardware) architecture(s) that are suitable for use with the disclosed implementations.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture can yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

FIG. 7 is a block diagram illustrating components of a machine 700, according to some example implementations, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein can be executed. The instructions 716 transform the general, non-programmed machine into a particular machine programmed to carry out the described and illustrated functions in the manner described. In alternative implementations, the machine 700 operates as a standalone device or can be coupled (e.g., networked) to other machines. In a networked deployment, the machine 700 can operate in the capacity of a server machine or a client machine in a server-client network environment, or as a peer machine in a peer-to-peer (or distributed) network environment. The machine 700 can comprise, but not be limited to, a server computer, a client computer, PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 can include processors 710, memory/storage 730, and I/O components 750, which can be configured to communicate with each other such as via a bus 702. In an example implementation, the processors 710 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) can include, for example, a processor 712 and a processor 714 that can execute the instructions 716. The term "processor" is intended to include multi-core processors that can comprise two or more independent processors (sometimes referred to as "cores") that can execute instructions contemporaneously. Although FIG. 7 shows multiple processors 710, the machine 700 can include a single processor with a single core, a single processor with multiple cores (e.g., a multi-core processor), multiple processors with a single core, multiple processors with multiples cores, or any combination thereof.

The memory/storage 730 can include a memory 732, such as a main memory, or other memory storage, and a storage unit 736, both accessible to the processors 710 such as via the bus 702. The storage unit 736 and memory 732 store the instructions 716 embodying any one or more of the methodologies or functions described herein. The instructions 716 can also reside, completely or partially, within the memory 732, within the storage unit 736, within at least one of the processors 710 (e.g., within the processor's cache memory), or any suitable combination thereof, during execution thereof by the machine 700. Accordingly, the memory 732, the storage unit 736, and the memory of the processors 710 are examples of machine-readable media.

As used herein, "machine-readable medium" means a device able to store instructions (e.g., instructions 716) and data temporarily or permanently and can include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 716. The term "machine-readable medium" shall also be taken to include any medium, or combination of multiple media, that is capable of storing instructions (e.g., instructions 716) for execution by a machine (e.g., machine 700), such that the instructions, when executed by one or more processors of the machine (e.g., processors 710), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 750 can include a wide variety of components to receive input, provide output, produce output, transmit information, exchange information, capture measurements, and so on. The specific I/O components 750 that are included in a particular machine will depend on the type of machine. For example, portable machines such as mobile phones will likely include a touch input device or other such input mechanisms, while a headless server machine will likely not include such a touch input device. It will be appreciated that the I/O components 750 can include many other components that are not shown in FIG. 7. The I/O components 750 are grouped according to functionality merely for simplifying the following discussion and the grouping is in no way limiting. In various example implementations, the I/O components 750 can include output components 752 and input components 754. The output components 752 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example implementations, the I/O components 750 can include biometric components 756, motion components 758, environmental components 760, or position components 762, among a wide array of other components. For example, the biometric components 756 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 758 can include acceleration sensor components (e.g., accelerometer), gravitation sensor components, rotation sensor components (e.g., gyroscope), and so forth. The environmental components 760 can include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that can provide indications, measurements, or signals corresponding to a surrounding physical environment. The position components 762 can include location sensor components (e.g., a Global Position System (GPS) receiver component), altitude sensor components (e.g., altimeters or barometers that detect air pressure from which altitude can be derived), orientation sensor components (e.g., magnetometers), and the like.

Communication can be implemented using a wide variety of technologies. The I/O components 750 can include communication components 764 operable to couple the machine 700 to a network 780 or devices 770 via a coupling 782 and a coupling 772, respectively. For example, the communication components 764 can include a network interface component or other suitable device to interface with the network 780. In further examples, the communication components 764 can include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 770 can be another machine or any of a wide variety of peripheral devices (e.g., a peripheral device coupled via a USB).

Moreover, the communication components 764 can detect identifiers or include components operable to detect identifiers. For example, the communication components 764 can include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information can be derived via the communication components 764, such as location via Internet Protocol (IP) geolocation, location via Wi-Fi® signal triangulation, location via detecting an NFC beacon signal that can indicate a particular location, and so forth.

In various example implementations, one or more portions of the network 780 can be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 780 or a portion of the network 780 can include a wireless or cellular network and the coupling 782 can be a Code Division Multiple Access (CDMA) connection, a Global System for Mobile communications (GSM) connection, or another type of cellular or wireless coupling. In this example, the coupling 782 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 716 can be transmitted or received over the network 780 using a transmission medium via a network interface device (e.g., a network interface component included in the communication components 764) and utilizing any one of a number of well-known transfer protocols (e.g., HTTP). Similarly, the instructions 716 can be transmitted or received using a transmission medium via the coupling 772 (e.g., a peer-to-peer coupling) to the devices 770. The term "transmission medium" shall be taken to include any intangible medium that is capable of storing, encoding, or carrying the instructions 716 for execution by the machine 700, and includes digital or analog communications signals or other intangible media to facilitate communication of such software.

Throughout this specification, plural instances can implement components, operations, or structures described as a single instance. Although individual operations of one or more methods are illustrated and described as separate operations, one or more of the individual operations can be performed concurrently, and nothing requires that the operations be performed in the order illustrated. Structures and functionality presented as separate components in example configurations can be implemented as a combined structure or component. Similarly, structures and functionality presented as a single component can be implemented as separate components. These and other variations, modifications, additions, and improvements fall within the scope of the subject matter herein.

Although an overview of the inventive subject matter has been described with reference to specific example implementations, various modifications and changes can be made to these implementations without departing from the broader scope of implementations of the present disclosure. Such implementations of the inventive subject matter can be referred to herein, individually or collectively, by the term "invention" merely for convenience and without intending to voluntarily limit the scope of this application to any single disclosure or inventive concept if more than one is, in fact, disclosed.

The implementations illustrated herein are described in sufficient detail to enable those skilled in the art to practice the teachings disclosed. Other implementations can be used and derived therefrom, such that structural and logical substitutions and changes can be made without departing from the scope of this disclosure. The Detailed Description, therefore, is not to be taken in a limiting sense, and the scope of various implementations is defined only by the appended claims, along with the full range of equivalents to which such claims are entitled.

As used herein, the term "or" can be construed in either an inclusive or exclusive sense. Moreover, plural instances can be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and can fall within a scope of various implementations of the present disclosure. In general, structures and functionality presented as separate resources in the example configurations can be implemented as a combined structure or resource. Similarly, structures and functionality presented as a single resource can be implemented as separate resources. These and other variations, modifications, additions, and improvements fall within a scope of implementations of the present disclosure as represented by the appended claims. The specification and drawings are, accordingly, to be regarded in an illustrative rather than a restrictive sense.

What is claimed is:

1. A client computing device, comprising:
a processor; and
memory storing instructions that, when executed by the processor, cause the processor to perform acts comprising:
receiving, within an operating system (OS) search box in a navigation bar of the OS of the client computing device, a search query from a user;
transmitting the search query to a search engine;
receiving a web search result from the search engine, wherein the web search result is identified by the search engine based upon the search query, wherein the web search result has a relevance score assigned thereto, the relevance score indicative of a relevance of the web search result to the search query, and further wherein the web search result comprises graphical content;
executing a search over local storage of the client computing device based upon the search query;
identifying a local search result based on the search query and activity history of the user, wherein the local search result has a second relevance score assigned thereto;
based upon the relevance score assigned to the web search result, presenting a portion of the graphical content in a graphical window provided by the OS in response to the OS search box being selected, wherein the portion of the graphical content is less than an entirety of the graphical content; and
based upon the second relevance score, presenting the local search result in the graphical window in addition to the portion of the graphical content.

2. The client computing device of claim 1, wherein the activity history of the user includes a browsing history of the user.

3. The client computing device of claim 1, wherein the activity history of the user includes prior search queries of the user.

4. The client computing device of claim 1, wherein the portion of the graphical content is presented in response to the web search result having the relevance score above a relevance score threshold.

5. The client computing device of claim 1, wherein the search engine obtains the web search result concurrently with the client computing device executing the search over the local storage.

6. The client computing device of claim 1, the acts further comprising:
receiving suggested search queries based upon the search query; and
presenting the suggested search queries in a second graphical window provided by the OS.

7. The client computing device of claim 6, wherein the suggested search queries are determined to be relevant with respect to the web search result.

8. The client computing device of claim 6, the acts further comprising:
receiving a selection of a suggested search query of the suggested search queries;
transmitting the suggested search query to the search engine;
receiving a second web search result from the search engine, wherein the second web search result is identified by the search engine based upon the suggested search query; and
replacing contents of the graphical window with graphical content associated with the second web search result.

9. The client computing device of claim 1, wherein the graphical content comprises an image.

10. The client computing device of claim 1, wherein the graphical content comprises a rendering of a portion of a web page.

11. The client computing device of claim 1, wherein the graphical window provided by the OS is located adjacent to the OS search box in the navigation bar.

12. A method comprising:
receiving, via an operating system search box of a computing device, a search query;
transmitting the search query to a search engine;
receiving a web search result from the search engine, wherein the web search result is identified by the search engine based upon the search query, wherein the web search result has a first relevance score assigned thereto, wherein the first relevance score is indicative of a relevance of the web search result to the search query;
executing a search over local storage of the computing device based upon the search query;
obtaining a local search result based upon search results for the search, wherein the local search result has a second relevance score assigned thereto, wherein the second relevance score is indicative of a relevance of the local search result to the search query;
comparing a first relevance score for the web search result and a second relevance score for the local search result; and
in response to the first relevance score exceeding the second relevance score, displaying a graphical representation of the web search result adjacent to the operating system search box, wherein the graphical representation comprises a graphical image extracted from a web page associated with the web search result.

13. The method of claim 12, further comprising:
in response to the second relevance score exceeding a relevance score threshold, presenting the local search result in addition to the graphical representation of the web search result.

14. The method of claim 12, further comprising:
receiving suggested search queries based upon the search query; and presenting the suggested search queries in the operating system search box.

15. The method of claim 14, wherein the suggested search queries are determined to be relevant with respect to the web search result.

16. The method of claim 15; further comprising:
receiving a selection of a suggested search query of the suggested search queries;
transmitting the suggested search query to the search engine;
receiving a second web search result from the search engine, wherein the second web search result is identified by the search engine based upon the suggested search query; and
replacing the graphical image associated with the web search result with a second graphical image associated with the second web search result.

17. A non-transitory computer-readable storage medium having instructions stored thereon that, when executed by a processor of a client computing device, cause the processor to perform acts comprising:
receiving, within an operating system (OS) search box in a navigation bar of the OS of the client computing device, a search query from a user;
transmitting the search query to a search engine;
receiving a web search result from the search engine, wherein the web search result is identified by the search engine based upon the search query, wherein the web search result has a first relevance score assigned thereto, the first relevance score indicative of a relevance of the web search result to the search query;
executing a search over local storage of the client computing device based upon the search query;
obtaining a local search result based upon search results for the search, wherein the local search result has a second relevance score assigned thereto;
in response to the first relevance score exceeding a relevance score threshold, presenting a portion of a web page within a graphical window provided by the OS, the portion being extracted from the web page and less than an entirety of the web page; and
in response to the second relevance score exceeding the relevance score threshold, presenting the local search result and selectable options for interacting with the local search result within the graphical window provided by the OS.

18. The non-transitory computer-readable storage medium of claim 17, wherein the portion being extracted from the web page comprises an image.

19. The non-transitory computer-readable storage medium of claim 17, the acts further comprising:
receiving suggested search queries based upon the search query; and
presenting the suggested search queries in the OS search box.

* * * * *